(12) United States Patent
Son et al.

(10) Patent No.: US 10,464,643 B2
(45) Date of Patent: Nov. 5, 2019

(54) FUEL CELL-BASED LIFE JACKET

(71) Applicant: DAEGU GYEONGBUK INSTITUTE OF SCIENCE AND TECHNOLOGY, Daegu (KR)

(72) Inventors: Byung Rak Son, Daegu (KR); Dong Ha Lee, Daegu (KR); Oh-Seok Kwon, Busan (KR); Won-Seok Kang, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 16/317,203

(22) PCT Filed: Sep. 20, 2016

(86) PCT No.: PCT/KR2016/010453
§ 371 (c)(1),
(2) Date: Jan. 11, 2019

(87) PCT Pub. No.: WO2018/012670
PCT Pub. Date: Jan. 18, 2018

(65) Prior Publication Data
US 2019/0248457 A1 Aug. 15, 2019

(30) Foreign Application Priority Data
Jul. 12, 2016 (KP) .................. 10-2016-0088001

(51) Int. Cl.
*B64C 9/08* (2006.01)
*B63C 9/08* (2006.01)
(Continued)

(52) U.S. Cl.
CPC ............... *B63C 9/08* (2013.01); *B63C 9/20* (2013.01); *H01M 8/04007* (2013.01);
(Continued)

(58) Field of Classification Search
CPC ............... B63C 9/08; B63C 9/20; B63C 9/11
See application file for complete search history.

(56) References Cited

U.S. PATENT DOCUMENTS 5,265,782 A * 11/1993 McNamara ............ A41D 13/12
2/108
5,823,838 A * 10/1998 Darcy .................... B63C 9/115
441/106

(Continued)

FOREIGN PATENT DOCUMENTS

KR      20070088131 A    8/2007
KR      20130103992 A    9/2013
(Continued)

*Primary Examiner* — Stephen P Avila
(74) *Attorney, Agent, or Firm* — Lando & Anastasi, LLP

(57) ABSTRACT

The present invention relates to a life jacket based on a fuel cell that can store hydrogen fuel in it. Particularly, the present invention provides a fuel cell based life jacket that can utilize electricity, heat and water generated during the operation of a fuel cell as a power source of a life extension tool and a personal location beacon. The fuel cell based life jacket of the present invention comprises a fuel cell unit for supplying electricity, a hydrogen fuel supply unit for storing and supplying the hydrogen fuel required for the fuel cell unit to generate electricity, a signal output unit for transmitting a signal using the electricity generated by the fuel cell unit, and a heat generating unit for recovering and transferring the heat generated in the fuel cell unit, wherein the hydrogen fuel supply unit generates hydrogen by using a hydrogen generation composition.

5 Claims, 7 Drawing Sheets

(51) Int. Cl.
*B63C 9/20* (2006.01)
*H01M 8/04007* (2016.01)
*H01M 8/04082* (2016.01)
*H01M 8/04119* (2016.01)
*H01M 8/065* (2016.01)
*B63C 9/11* (2006.01)

(52) U.S. Cl.
CPC ... *H01M 8/04156* (2013.01); *H01M 8/04201* (2013.01); *H01M 8/065* (2013.01); *B63C 9/11* (2013.01); *H01M 2250/30* (2013.01)

(56) References Cited

U.S. PATENT DOCUMENTS

2006/0235498 A1 10/2006 Mollendorf et al.
2012/0244765 A1 9/2012 Huang et al.

FOREIGN PATENT DOCUMENTS

| KR | 20140092274 A | 7/2014 |
| KR | 101449034 B1 | 10/2014 |
| KR | 20150041900 A | 4/2015 |
| KR | 20160061664 A | 6/2016 |

\* cited by examiner

FUEL CELL-BASED LIFE JACKET

CROSS-REFERENCE TO RELATED APPLICATIONS

This application is a U.S. national phase application and claims the benefit of priority under 35 U.S.C. § 371 of International Patent Application Serial No. PCT/KR2016/010453, filed on Sep. 20, 2016 and titled "FUEL CELL-BASED LIFE JACKET" which claims priority to Korean Patent Application Serial No. 10-2016-0088001, filed on Jul. 12, 2016, the contents of each of which are hereby incorporated herein by reference in their entireties for all purposes.

BACKGROUND OF THE INVENTION

1. Field of the Invention

The present invention relates to a fuel cell based life jacket, more particularly a fuel cell based life jacket that can utilize electricity, heat and water generated from a fuel cell as a life extension tool in the emergency of disaster.

2. Description of the Related Art

In general, a life jacket is a device that prevents a drowning accident by keeping a wearer floating on water in the case of a water accident on river, lake and sea.

Such life jacket has increased maritime safety significantly by preventing people in distress from drowning by keeping many survivors floating on water in a variety of water accidents.

However, when a water accident occurs in such a large area like sea and people are missing, it is difficult to find the victims because it is necessary to conduct a search operation over a large area. And the victim may be in the water for a long time, so the life jacket is going to be wet and lose buoyancy or hypothermia may occur in the victim.

Related prior art references include the following patent documents.

Korean Patent No. 10-1449034
Korean Patent Publication No. 10-2013-0103992

SUMMARY OF THE INVENTION

It is an object of the present invention to provide a fuel cell based life jacket capable of storing a large amount of hydrogen fuel by using the hydrogen storage capability of a hydrogen generation composition.

It is another object of the present invention to provide a fuel cell based life jacket that can utilize electricity, heat and water generated during the operation of a fuel cell as a power source of a life extension tool and a personal location beacon.

The fuel cell based life jacket according to an example of the present invention comprises a fuel cell unit for supplying electricity, a hydrogen fuel supply unit for storing and supplying the hydrogen fuel required for the fuel cell unit to generate electricity, a signal output unit for transmitting a signal using the electricity generated by the fuel cell unit, and a heat generating unit for recovering and transferring the heat generated in the fuel cell unit, wherein the hydrogen fuel supply unit generates hydrogen by using a hydrogen generation composition.

The fuel cell unit above can be located in the lower part of the life jacket.

The hydrogen generation composition above can generate hydrogen by reacting with water introduced from outside.

The life jacket can include a by-product recovery unit for discharging the by-product generated in the hydrogen fuel supply unit to the outside.

The signal output unit can include a rescue transmitter that can transmit a signal selected from the group consisting of electric wave, light wave, infrared ray and ultrasonic wave by using the electricity generated from the fuel cell unit.

The signal output device includes a light emitter, so that the electricity generated from the fuel cell unit is applied to the light emitter which can output a signal for the identification of the user's location.

The heat generating unit can include a waste heat exchanger for recovering the heat of the fuel cell unit, and a heat conductor connected to the waste heat exchanger and equipped in order to deliver the heat to the inside of the life jacket and at the same time to accumulate and release the heat as well.

The life jacket provided by the present invention can additionally include a drinking water conversion unit which is connected to the fuel cell unit in such a manner that pure water produced during the electrochemical reaction in the fuel cell unit is supplied and the pure water is supplied as drinking water.

The drinking water conversion unit contains a pure water supply tube through which pure water generated from the fuel cell unit can be supplied, a filter installed in the pure water supply tube in order to filter water to provide drinking water, and a water tank to store the drinking water filtered by the filter above.

Advantageous Effect

The life jacket according to an example of the present invention has the effect of overcoming the disadvantages of a life jacket using the conventional heat generating pack.

The life jacket according to an example of the present invention can supply heat in order to maintain the body temperature for a long period of time and can supply the minimum amount of water required for life conservation in case of an emergency.

The life jacket according to an example of the present invention can transmit various distress signals usable for searching a survivor even from a long distance.

BRIEF DESCRIPTION OF THE DRAWINGS

The application of the preferred embodiments of the present invention is best understood with reference to the accompanying drawings, wherein.

DESCRIPTION OF THE PREFERRED EMBODIMENTS

Hereinafter, preferred embodiments of the present invention are described with the attached figures. However, the embodiments of the present invention can be modified in various manners, and the scope of the present invention is not limited to the embodiments described below. The embodiments of the present invention are provided to those in the art to understand more clearly. Therefore, some of the shapes and size of the elements illustrated in the figures can be exaggerated for better explanation and the elements designated by the same mark indicate the same elements. The same marks are used throughout the figures for the portions having similar functions and actions. In addition, the term "include/contain" used throughout the specification means not excluding other elements but including any additional elements, unless specifically stated to the contrary.

The fuel cell based life jacket according to an example of the present invention comprises a fuel cell unit for supplying electricity, a hydrogen fuel supply unit for storing and supplying the hydrogen fuel required for the fuel cell unit to generate electricity, a signal output unit for transmitting a signal using the electricity generated by the fuel cell unit, and a heat generating unit for recovering and transferring the heat generated in the fuel cell unit, wherein the hydrogen fuel supply unit generates hydrogen by using a hydrogen generation composition.

Figure 1:
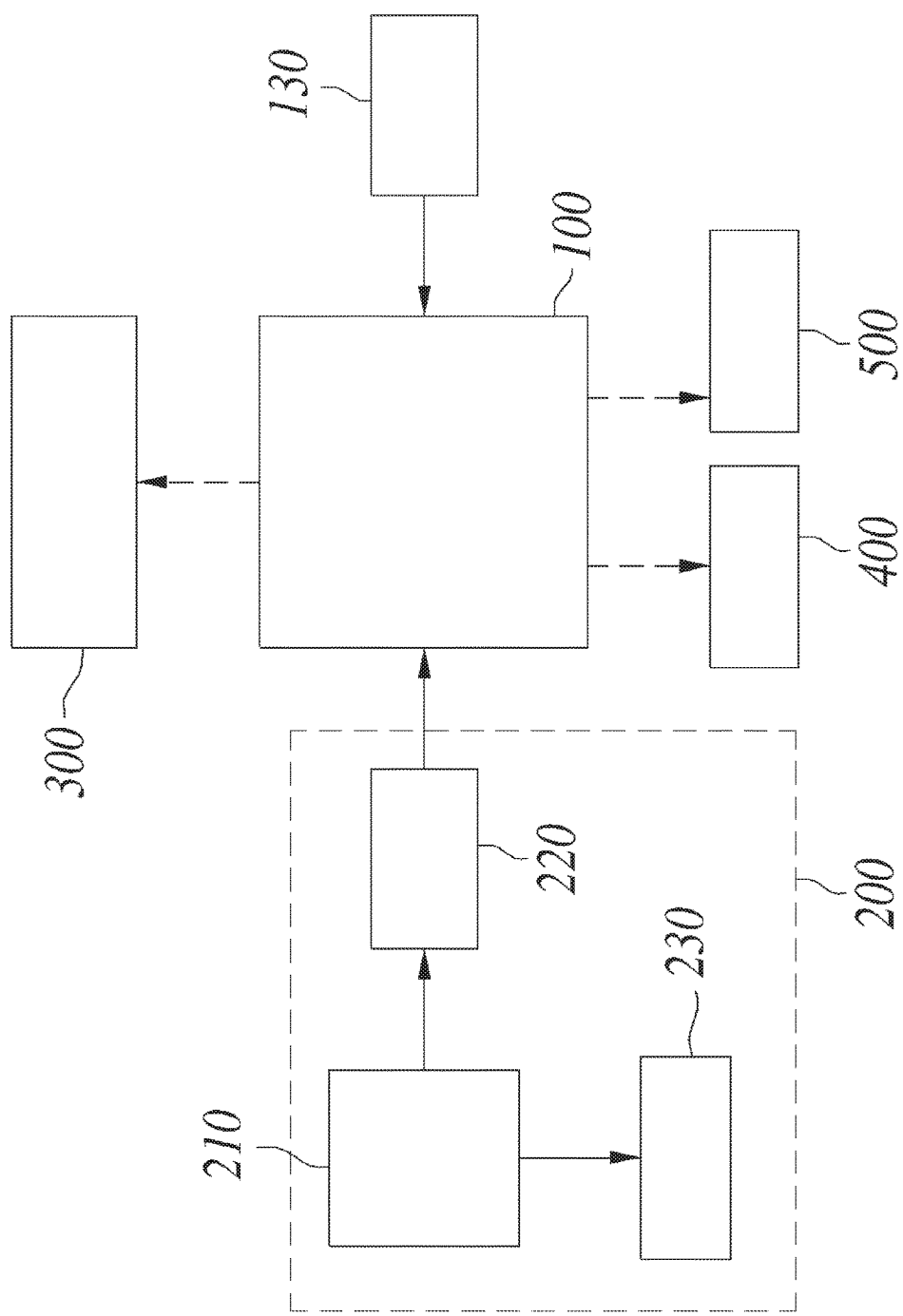
FIG. 1 is a schematic diagram illustrating the system of the fuel cell based life jacket according to an example of the present invention.
Figure 2:
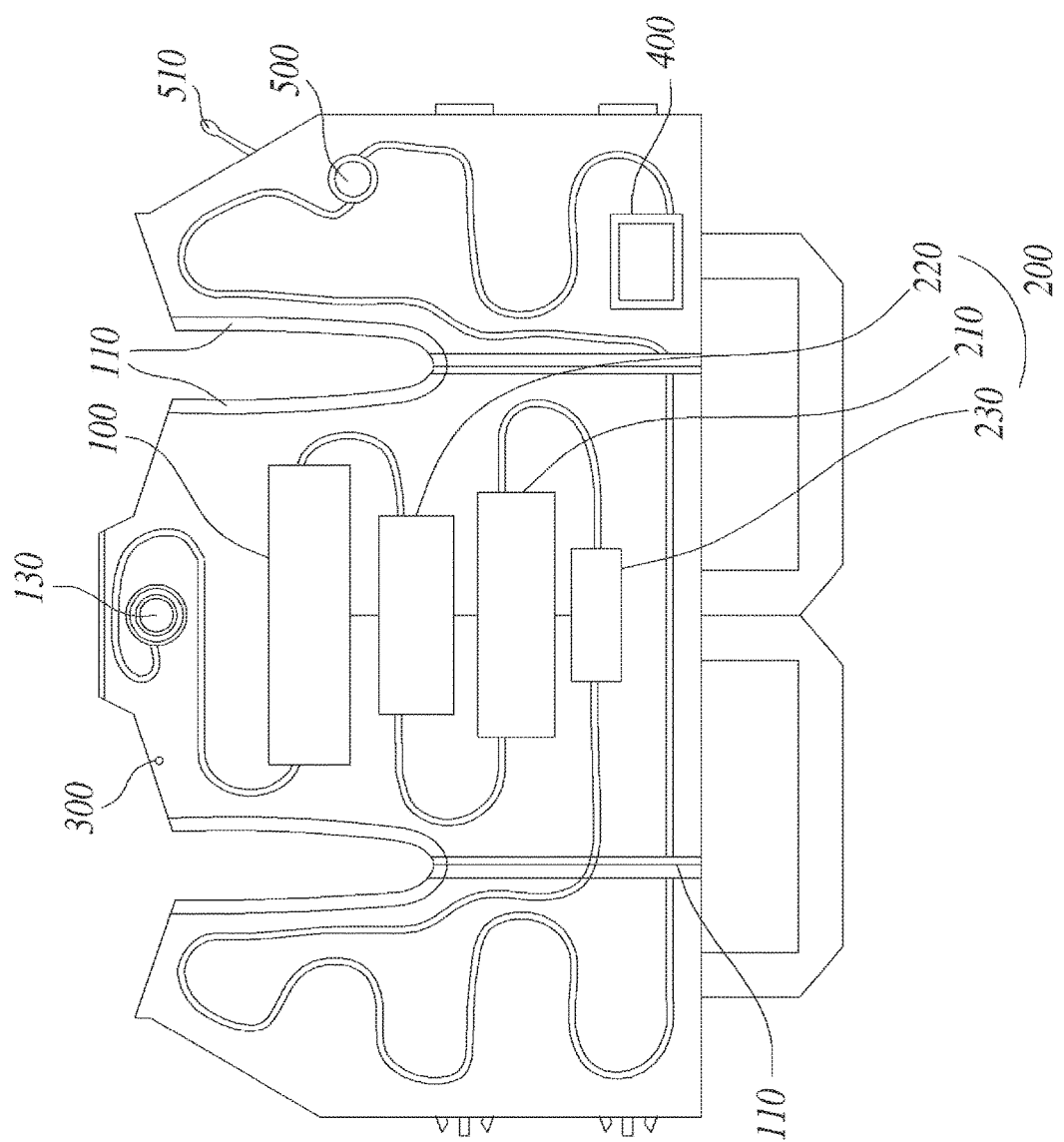
FIG. 2 is a configuration diagram illustrating the fuel cell based life jacket according to an example of the present invention.
Figure 3:
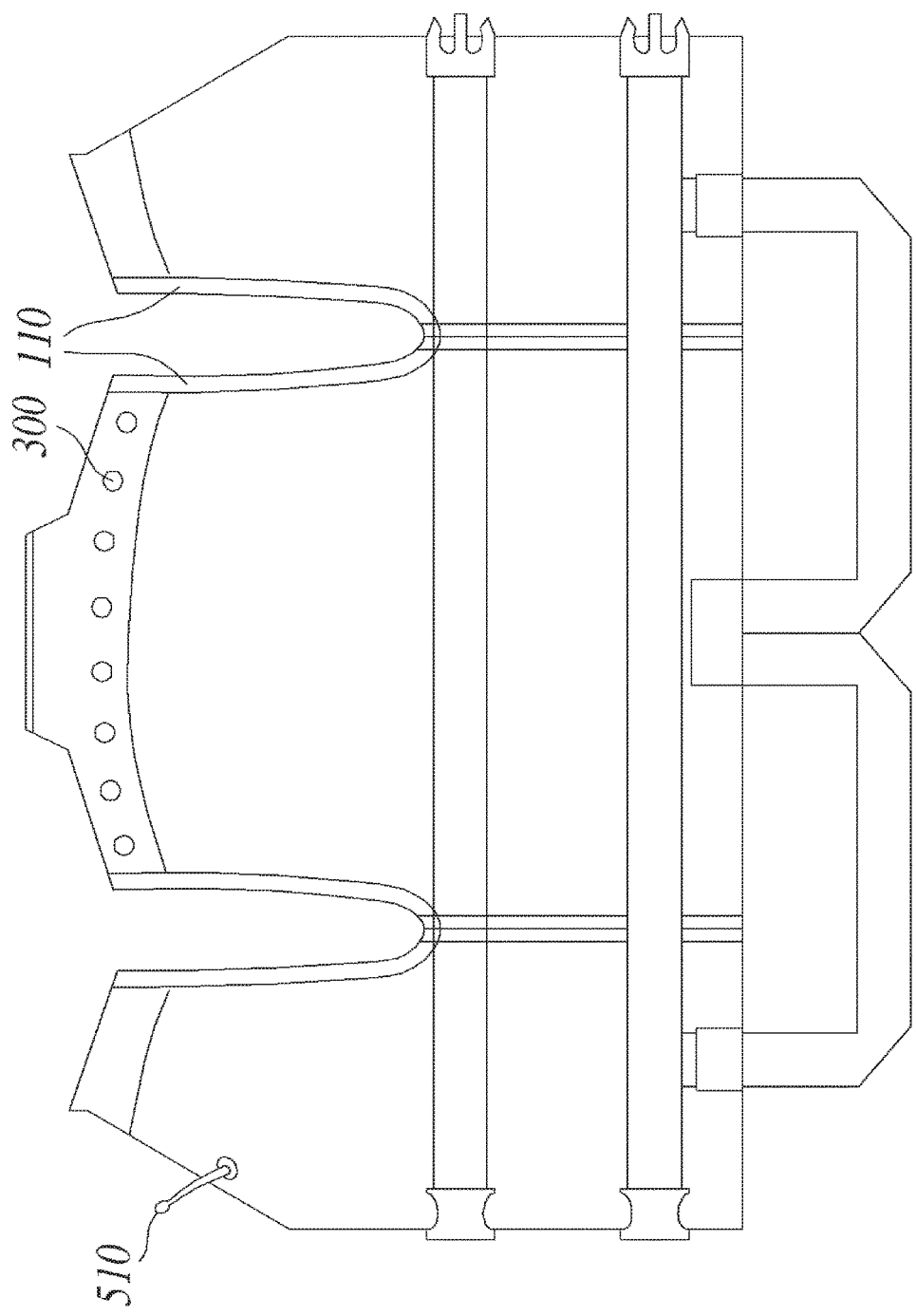
FIG. 3 is a diagram illustrating the body part of the life jacket according to an example of the present invention.
Figure 4:
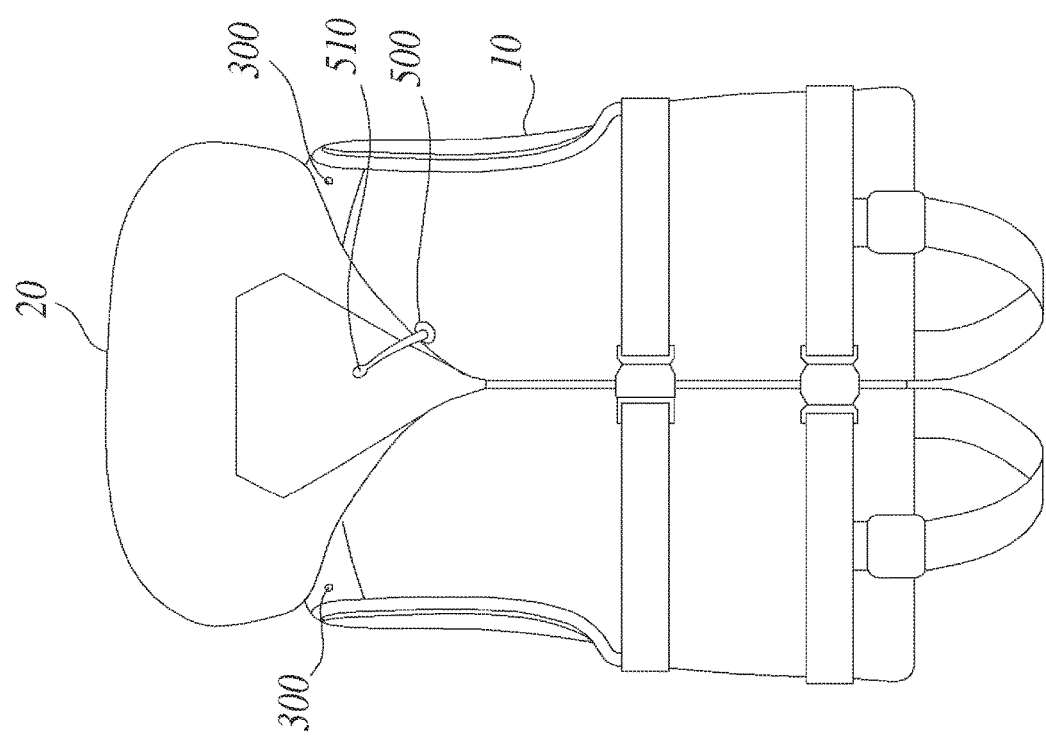
FIG. 4 is a diagram illustrating the life jacket in a fastened state according to an example of the present invention.

FIG. 1 is a schematic diagram illustrating the fuel cell based life jacket according to an example of the present invention. In this example, the life jacket is composed of a fuel cell unit (100), a hydrogen fuel supply unit (200), a signal output unit (300) and a heat generating unit (400).

In an example of the present invention, the life jacket above is formed in a garment that can be worn on the user's body. The life jacket can be designed in various forms which are wearable and detachable to the human body.

The surface of the life jacket is made of a waterproof fabric in order to prevent water infiltration toward the inside of the jacket, indicating the life jacket has water tightness.

A buoyant body having buoyancy can be installed in the life jacket. The buoyant body can be composed of a foamed resin such as expanded styrene resin and low-density polyethylene resin which is lighter than water.

The life jacket can be equipped with a fastening device for a person who wears to fasten it. Particularly, a fastening device such as a zipper or a buckle can be equipped on the front of the life jacket for a user can easily fasten it.

A silicone tape (110) is provided on an armhole and a side line of the lifejacket so as to be more closely attached to the user's body so that the lifejacket is not pushed up in water to provide a sense of stability and a body temperature increase. The life jacket can be attached with silicone tape (110) on armhole and side line, which prevents the jacket from crawling up in water and instead helps a wearer to put it on tightly to provide stability and the effect of raising body temperature.

The fuel cell unit (100) can be functioning to generate electric energy necessary for the signal output unit (300) and heat source necessary for the heat generating unit (400).

The fuel cell unit can be embedded in the life jacket as an integral all-in-one form or can be attached as a separated part detachable from the life jacket.

The fuel cell unit can contain a polymer electrolyte fuel cell.

The unit cell of the polymer electrolyte fuel cell may include an anode and a cathode on both sides of a polymer electrolyte membrane having.

The unit cell of the polymer electrolyte fuel cell can be composed of anode and cathode on both sides of the polymer electrolyte membrane having an excellent ion conductivity of proton. A plurality of such unit cells can be stacked to form one fuel cell stack.

In an example of the present invention, the hydrogen fuel supply unit (200) can include a hydrogen generator (210), a hydrogen storage tank (220) and a by-product collecting device (230).

In an example of the present invention, the hydrogen fuel supply unit above can generate hydrogen by using a hydrogen generation composition. The hydrogen generation composition can contain a metal hydride represented by the general formula of MM'H4. Herein, M is an alkali metal, ammonium, or organic group, M' is a group 13 element such as boron, aluminum or gallium, and H is hydrogen. More specifically, the examples of the metal hydride represented by the general formula of MM'H$_4$ are NaBH$_4$, LiBH$_4$, KBH$_4$, NH$_4$BH$_4$, (CH$_3$)$_4$NH$_4$BH$_4$, NaAlH$_4$, LiAlH$_4$, KAlH$_4$, NaGaH$_4$, LiGaH$_4$, KGaH$_4$, and a mixture thereof.

The hydrolysate of the metal hydride can be represented, for example, by the general formula of MM'O$_2$. Herein, M is an alkali metal, ammonium, or organic group, M' is a group 13 element such as boron, aluminum or gallium, and H is hydrogen.

Another example of the metal hydride can be one or more substances selected from the group consisting of MgH$_2$, CaH$_2$, NH$_3$BH$_3$, Ca (BH$_4$)$_2$, Mg(BH$_4$)$_2$, LiH, and KH, but not always limited thereto.

Formula 1 is the formula of hydrolysis of sodium borohydride (NaBH$_4$), one of alkali boron hydrides. Sodium borohydride (NaBH$_4$) is a stable substance having relatively high hydrogen content, compared with other substances, and is an incombustible alkali solution which is an environmentally friendly and renewable fuel. Therefore, the hydrogen produced by this method has a high purity and is easy to control the reaction thereof.

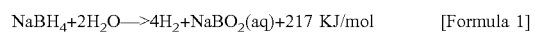

$$NaBH_4+2H_2O \longrightarrow 4H_2+NaBO_2(aq)+217 \text{ KJ/mol} \quad \text{[Formula 1]}$$

In formula 1 above, the method to produce hydrogen using sodium borohydride (NaBH$_4$) induces an exothermic reaction even at room temperature, so that the system is simple and easy to integrate with the fuel cell because no additional heat supply is required. Sodium borohydride (NaBH$_4$) can generate hydrogen only through a catalytic reaction because the aqueous solution of sodium borohydride (NaBH$_4$) is prepared as a strongly alkaline (pH 13 or higher) solution to inhibit auto-hydrolysis in the absence of a catalyst.

The hydrogen generation composition of the present invention can additionally include a stabilizing agent in order to prevent unwanted hydrolysis of the metal hydride during long-term storage. A stabilizing agent is any component that can retard or interfere with the reaction of the metal hydride with water. The addition of the stabilizing agent typically ensures that pH of the hydrogen generation composition at room temperature (25° C.) is at least 7, preferably at least 11, more preferably at least 13, and even more preferably at least 14. Therefore, the addition amount of the stabilizing agent can also be adjusted so that the hydrogen generation composition has such pH value.

As the stabilizing agent, for example, a hydroxide corresponding to the cationic portion of the metal hydride can be used. The stabilizing agent is specifically exemplified by sodium hydroxide, lithium hydroxide, potassium hydroxide, and a mixture thereof.

Another example of the stabilizing agent is a non-hydroxide stabilizing agent that can increase overvoltage in the course of hydrolysis of the metal hydride. As the non-hydroxide stabilizing agent, for example, a compound containing lead, tin, cadmium, zinc, gallium, mercury or sulfur can be used.

The hydrogen generation composition of the present invention can additionally include a hydrogen generation catalyst in order to accelerate the hydrolysis reaction of the metal hydride. As the hydrogen generation catalyst, for example, a transition metal, a transition metal boride, an alloy of these materials, and a mixture thereof can be used.

The transition metal catalyst is a catalyst containing a metal element selected from the group consisting of group IB to group VIIIB metal elements, or a compound produced from the said metal elements above. The representative examples of the metal includes a copper group element, a zinc group element, a scandium group element, a titanium group element, a vanadium group element, a chromium group element, a manganese group element, an iron group element, a cobalt group element and a nickel group element. The transition metal element or compound can accelerate the hydrolysis reaction of the metal hydride mediated by water. More specifically, the transition metal element or compound is exemplified by ruthenium, iron, cobalt, nickel, copper, manganese, rhodium, rhenium, platinum, palladium, chromium, silver, osmium, iridium, a boride thereof, an alloy thereof, and a mixture thereof.

The hydrogen generation catalyst used in the present invention can be prepared in different forms such as powders, agglomerates, meshes, etc. In the case of a hydrogen generation catalyst in the form of a powder, it may have an average particle size of typically about 100 μm or less, preferably about 50 μm or less, more preferably about 25 μm or less, in order to obtain a sufficient surface area.

If the content of the hydrogen generation catalyst is too small, the yield of hydrogen may be too small. If the content of the hydrogen generation catalyst is too much, a local overheating of the apparatus may occur and the economical efficiency may deteriorate. Considering the above, the content of the hydrogen generation catalyst is preferably about 0.1 to 2000 weight part, more preferably about 2 to 1500 weight part, and most preferably about 3 to 1500 weight part, based on 100 weight part of the metal hydride.

The hydrogen fuel supply unit according to an example of the present invention is a system to generate hydrogen through hydrolysis of the hydrogen generation composition. Hydrogen equivalent to the amount of hydrogen contained in the metal hydride can be obtained and hydrogen equivalent to the amount of hydrogen contained in the metal hydride by hydrolysis from water ($H_2O$) can be additionally obtained. So, the hydrogen storage capacity of the fuel supply unit is twice the hydrogen storage capacity of the metal hydride. In addition, since the reaction heat is not high at the time of generating hydrogen by the reaction and the pressure is almost at the normal pressure level, it can be safely managed.

Figure 5:
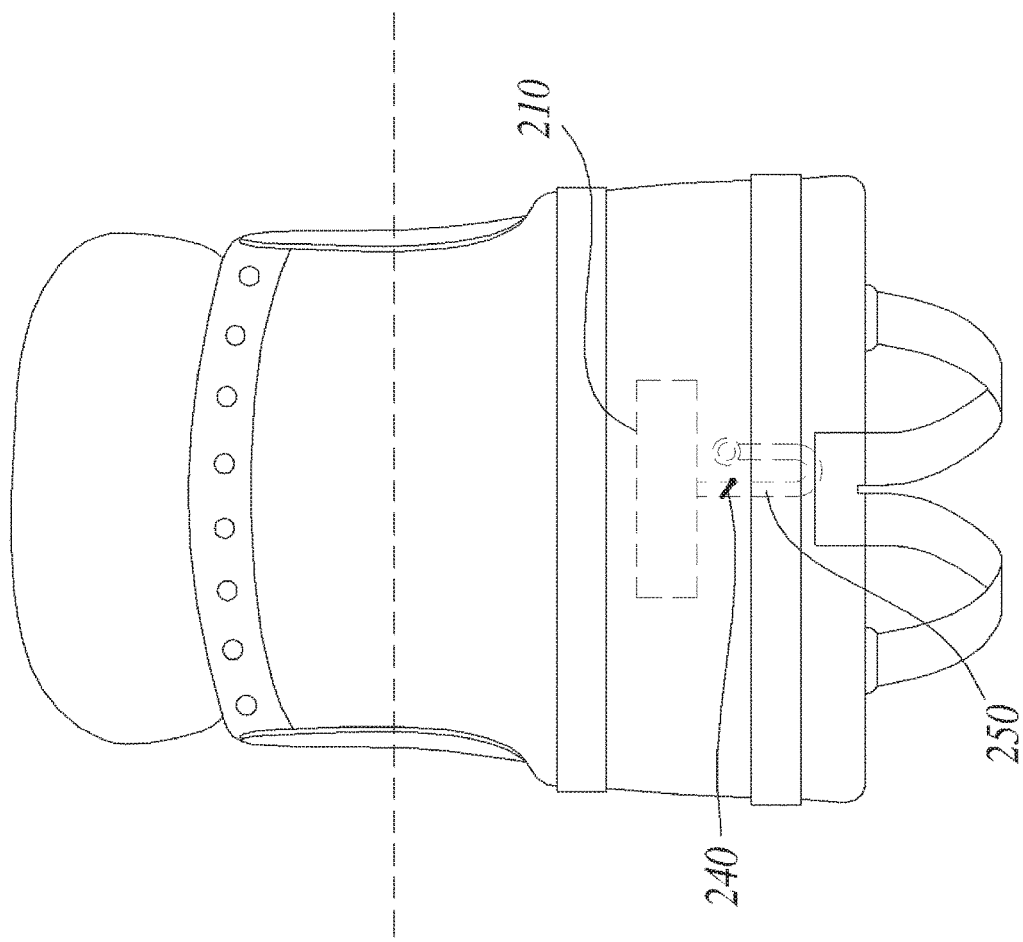
FIG. 5 is a diagram illustrating the life jacket designed for water in-flow from outside according to an example of the present invention.

In an example of the present invention, the hydrogen fuel supply unit is formed in the lower part of the life jacket so that it can be under the water in order to make water in-flow from outside easy when a survivor is afloat. The hydrogen generation composition can be tightly sealed in the hydrogen fuel supply unit as a mixture combined with a metal catalyst. The pressure of the hydrogen fuel supply unit can be relatively lower than around. Water inflowing from outside due to the pressure difference can be flowing into the hydrogen generator by an operation system. As shown in FIG. 5, the water tube (250) can be connected directly to the hydrogen generator (210). That is, when a survivor is afloat, water is flowing into the hydrogen generator equipped in the life jacket through the water tube (250) due to the water pressure.

In an example of the present invention, the water tube can be formed in a U shape, but is not limited thereto and any shape that allows water to flow into the hydrogen fuel supply unit can be accepted. The inlet of the water tube can be formed to be located in the water. Through the inlet, water can pass through from the outside into the hydrogen generator. The hydrogen generation composition undergoes a series of chemical reactions with externally introduced water, by which hydrogen is continuously generated.

Figure 6:
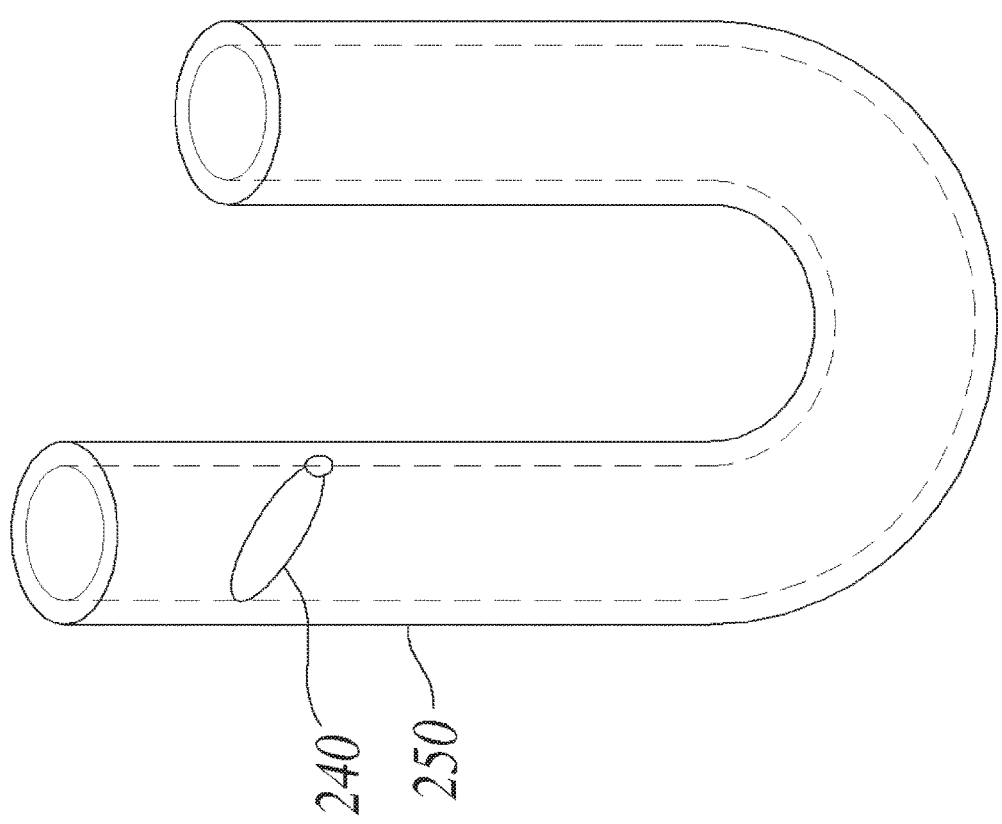
FIG. 6 is a diagram illustrating the water tube equipped in the life jacket to allow water to flow into the life jacket from outside according to an example of the present invention.

As shown in FIG. 6, a switch (240) can be installed in the water tube (250) in order to prevent the backflow of by-products after the chemical reaction. At this time, the opening and shutting of the switch is controlled by a control device, and only when the pressure inside the hydrogen fuel supply unit is sufficiently low, external water flows in. In this way, the external water flows in one direction toward the inside of the life jacket through the water tube, and the inflow rate can be controlled according to the generation speed of hydrogen fuel and by-products.

The water tube (250) can be made of a rubber-based material having elasticity, a Teflon-based material, a plastic-based material, a metal-based material, or a combined material of them. The rubber-based material can be exemplified by chloroprene rubber, silicone rubber, acrylic rubber, butyl rubber, fluor rubber, chlorosulfonated polyethylene rubber, natural rubber, styrene-butylene rubber, butadiene rubber and ethylene-propylene rubber. The Teflon-based material can be exemplified by PTFE (polytetrafluoro ethylene), PVDF (polyvinylidene fluoride), PFA (tetrafluoroethylene-perfluoroalkylvinylether copolymer), FEP (tetrafluoroethylene-hexafluoropropylene copolymer), ETFE (ethylene tetrafluoroethylene), CTFE (chlorotrifluoro ethylene) and PVF (polyvinyl fluoride).

The hydrogen fuel supply unit (200) can include an air supply device (130). The air supply device (130) above can be formed to let air flow into the fuel cell stack at any time under the condition of a living environment in which oxygen exists.

In an example of the present invention, the hydrogen generation composition can further include any additional compound in addition to the metal hydride. The additional compound is a compound that can release hydrogen, which can be an organic compound. The organic compound herein can be one or more compounds selected from the group consisting of cyclohexane, methylcyclohexane, decalin, N-ethylcarbazole, carbosilane and formic acid, but not always limited thereto. The additional compound can be ammonia, NaSi or Al, but not always limited thereto. Formula 2 shows hydrogen release by hydrolysis of NaSi.

$$2NaSi + 5H_2O \longrightarrow Na_2Si_2O_5 + 5H_2 \qquad [\text{Formula 2}]$$

Figure 7:
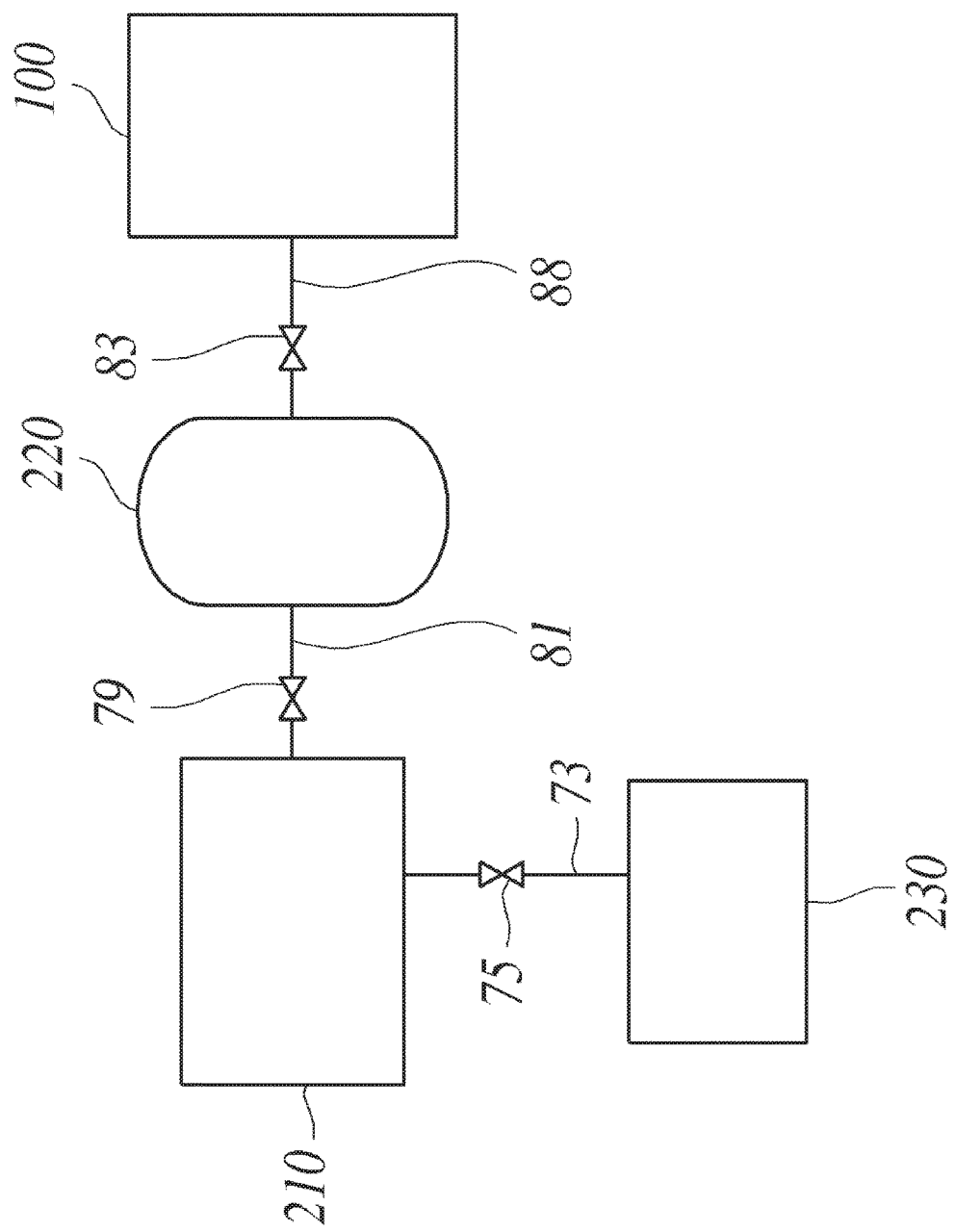
FIG. 7 is a block diagram illustrating the hydrogen generation system according to an example of the present invention.

The hydrogen fuel supply unit is functioning to supply the hydrogen fuel generated by hydrolysis of the hydrogen generation composition to the fuel cell unit. As shown in FIG. 7, a hydrogen transfer line (81) can be installed at one side of the hydrogen generator (210) to transmit the generated hydrogen fuel to the hydrogen storage tank (220). The hydrogen transfer line (81) is equipped with the second valve (79) to regulate the hydrogen fuel supply. At the other side of the hydrogen generator (210), the by-product transfer line (73) can be installed to transport the generated by-products to the by-product collecting device (230). The hydrogen fuel stored in the hydrogen storage tank (220) is transferred to the fuel cell unit (100) through the passage (88) formed at one side of the hydrogen storage tank (220) and the third valve (83) can regulate the flow rate of the hydrogen fuel according to the pressure of the fuel cell unit (100). The by-products generated from the hydrogen generator (210) can be transported to the by-product collecting device (230) through the by-product transfer line (73) equipped at the other side of the hydrogen generator (210). The by-product transfer line (73) can further comprise the first valve (75) which regulates the flow of the by-product. The by-product collecting device (230) is to increase the efficiency of hydrogen generation by collecting by-products.

The hydrogen generator (210), the hydrogen storage tank (220) and the by-product collecting device (230) can be a container made of a synthetic resin or metal in a certain thickness or can be made of other materials as long as they can provide a certain volume. The hydrogen generator (210), the hydrogen storage tank (220) and the by-product collecting device (230) can have a structure in which the respective containers are formed so as to communicate with each other or a structure in which one container is formed with partition walls.

The hydrogen generator can include a gas-liquid separation membrane. The gas-liquid separation membrane is a generally known membrane that can let gas pass through but does not let liquid pass through. So, the membrane discharges only hydrogen fuel generated from the hydrogen generator so that hydrogen can be stored in the hydrogen storage tank. The gas-liquid separation membrane can be made of Teflon-based GORETEX, Celgard, PTFE (polytetrafluoro ethylene), PVDF (polyvinyl difluoride), PFA (tetrafluoroethylene-perfluoroalkyl vinyl ether copolymer or polysulfone-based polymer or a mixture thereof. The temperature for the hydrogen generation reaction does not exceed the boiling point of the fuel or the glass transition temperature of the gas-liquid separation membrane.

The fuel cell unit can be configured to generate electric energy through chemical reaction of the hydrogen fuel supplied from the hydrogen fuel supply unit.

In an example of the present invention, the signal output unit (300) can include a rescue transmitter that can transmit a signal selected from the group consisting of electric wave, light wave, infrared ray and ultrasonic wave by using the electricity generated from the fuel cell unit.

The signal output unit is functioning to output a signal for requesting help to the outside such as a land rescue unit or a marine rescue unit in a distress situation.

The signal output unit can be installed in the upper part of the life jacket as connected to the fuel cell unit and is functioning to output a signal according to the electricity supply from the fuel cell unit.

The signal output unit can include a rescue transmitter that can wirelessly transmit a rescue signal selected from the group consisting of electric wave, light wave, infrared ray and ultrasonic wave by radio.

In an example of the present invention, the rescue transmitter can be designed to input or output a wireless signal by applying the structure and configuration of an RF communicator or a GPS satellite communicator. When a maritime distress occurs, the rescue transmitter is detached from the life jacket in a state of being connected to the life jacket and is kept floating by buoyancy. The rescue transmitter comprises a transmitter for transmitting the distress location and a receiver for displaying the distress location after receiving the distress location signal of the transmitter. Keeping the transmitter afloat on the water at the time of distress is advantageous to minimize the interruption of the rescue signal transmission by sea wave or sea water, so that the location of a survivor can be quickly and easily identified.

The signal output unit can also be designed to output a visual rescue signal in order for a rescuer to identify the location of a survivor. That is, the signal output unit can include a flickering illuminant on the life jacket, by which a rescue signal can be output by means of flickering light after the electricity is supplied from the fuel cell unit to the illuminant.

The illuminant has a transparent lid to protect the illuminant from certain impact and has a sealed structure tightly sealed not to allow water to enter the flickering circuit.

As described hereinabove, if the signal output unit is designed to output a rescue signal directly to a rescue team and at the same time to output a flickering light signal on the life jacket, quick response of a rescue team and the identification of the location of a survivor will be easy, and also night rescue can be fast operated.

In an example of the present invention, the heat generating unit (400) can include a waste heat exchanger to recover heat of the fuel cell unit and a heat conductor connected to the waste heat exchanger not only to transmit heat into the inside of the life jacket but also to accumulate and discharge heat whenever necessary.

The heat generating unit recovers waste heat from the fuel cell unit and delivers the waste heat to the life jacket. That is, the heat generating unit recovers waste heat which is heat energy generated during the chemical reaction of fuel in the fuel cell unit and then transfers the waste heat to the life jacket.

The heat conductor can be arranged evenly corresponding to the entire area of the life jacket, and can be functioning to accumulate and discharge heat.

The life jacket of the present invention composed as described above can generate a rescue signal and heat continuously by the reaction of oxygen with hydrogen fuel generated from the hydrogen fuel supply unit under the condition of a living environment in which oxygen exists. Therefore, it is easy for a rescue team to identify the location of a survivor and to respond quickly and accurately. In addition, the life jacket of the present invention not only increases the survivability of a survivor by keeping the body temperature thereof throughout the time of the distress but also significantly reduces the mortality rate caused by distress.

In another example of the present invention, the life jacket equipped with fuel cell according to the present invention can additionally include a drinking water conversion unit (500) designed to supply pure water generated during the chemical reaction in the fuel cell unit as drinking water.

During the chemical reaction in the fuel cell unit, pure water is generated as a by-product in addition to heat energy. Pure water generated in the fuel cell unit can be obtained through the drinking water conversion unit.

The drinking water conversion unit is composed of a pure water supply tube through which pure water generated from the fuel cell unit is supplied and a filter installed in the pure water supply tube in order to convert the pure water generated above into drinking water.

The filter above can be the same one applied to a general water purifier or a water purification system. The drinking water conversion unit above can additionally include a drinking water tank containing drinking water prepared by using the filter and a straw (510) connected to the drinking water tank and exposed to the outside in order for a user to drink water easily. The straw can be located at the upper part of the life jacket.

It is preferable that multiple drinking water tanks are installed on the life jacket so as to secure sufficient drinking water.

That is, according to the present invention, pure water generated from the fuel cell can be filtered to be prepared as drinking water and provided to those in distress so that the survivor's survivability can be increased due to the provided drinking water.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

BRIEF DESCRIPTION OF THE MARK OF DRAWINGS

- 10: life jacket body
- 20: neck support
- 73: by-product transfer line
- 75: first valve
- 79: second valve
- 81: hydrogen transfer line
- 83: third valve
- 88: passage
- 100: fuel cell unit
- 110: tightening tape
- 130: air supply device
- 200: hydrogen fuel supply unit
- 210: hydrogen generator
- 220: hydrogen storage tank
- 230: by-product collecting device
- 240: switch
- 250: water tube
- 300: signal output unit
- 400: heat generating unit
- 500: drinking water conversion unit
- 510: straw

What is claimed is:

1. A life jacket, comprising:
   a fuel cell unit for supplying electricity;
   a hydrogen fuel supply unit for storing and supplying the hydrogen fuel required for the fuel cell unit to generate electricity;
   a signal output unit for transmitting a signal using the electricity generated by the fuel cell unit;
   a heat generating unit for recovering and transferring the heat generated in the fuel cell unit; and
   a drinking water conversion unit which is connected to the fuel cell unit in such a manner that pure water produced during an electrochemical reaction in the fuel cell unit is supplied and the pure water is supplied as drinking water,
   wherein the hydrogen fuel supply unit is installed in a lower part of the life jacket and includes a hydrogen generator and a water tube in a U shape which is directly connected to the hydrogen generator so as to allow external water to flow into the hydrogen generator through the water tube due to water pressure, wherein the water tube is installed with a switch to allow the external water to flow in when a pressure inside the hydrogen fuel supply unit is low,
   wherein the hydrogen fuel supply unit comprises a hydrogen generation composition which generates hydrogen by reacting with water introduced from outside, a metal hydride, and a stabilizing agent in order to prevent hydrolysis of the metal hydride during storage, wherein the stabilizing agent is added in at least pH 7 of the hydrogen generation composition, and
   wherein the drinking water conversion unit contains a pure water supply tube through which the pure water generated from the fuel cell unit can be supplied, a filter installed in the pure water supply tube in order to filter water to provide drinking water, and a water tank to store the drinking water filtered by the filter.

2. The life jacket according to claim 1, wherein the life jacket contains a by-product collecting device for discharging the by-products generated in the fuel cell unit.

3. The life jacket according to claim 1, wherein the signal output unit contains a rescue transmitter that can transmit a signal selected from the group consisting of electric wave, light wave, infrared ray and ultrasonic wave by using the electricity generated from the fuel cell unit.

4. The life jacket according to claim 1, wherein the signal output unit contains an illuminant and outputs a signal capable of identifying the user's position by applying the electricity generated from the fuel cell unit to the illuminant.

5. The life jacket according to claim 1, wherein the heat generating unit contains a waste heat exchanger for recovering the heat of the fuel cell unit, and a heat conductor connected to the waste heat exchanger and equipped in order to deliver the heat to the inside of the life jacket and at the same time to accumulate and release the heat as well.

* * * * *